Dec. 20, 1955  G. W. MacARTHUR  2,727,544
NUT ACTUATED CLAMP BAR

Filed May 19, 1952

INVENTOR.
GEORGE W. MacARTHUR
BY Whittemore,
Hulbert & Belknap
ATTORNEYS

Dec. 20, 1955 G. W. MacARTHUR 2,727,544
NUT ACTUATED CLAMP BAR
Filed May 19, 1952 2 Sheets-Sheet 2
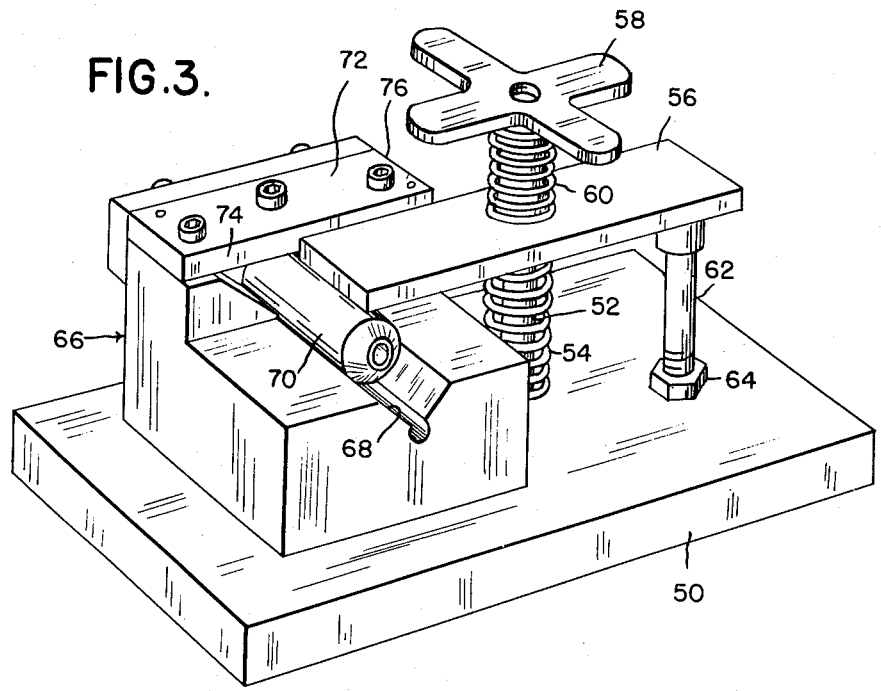
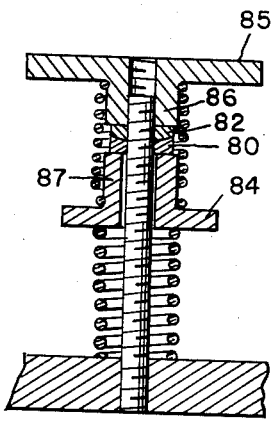
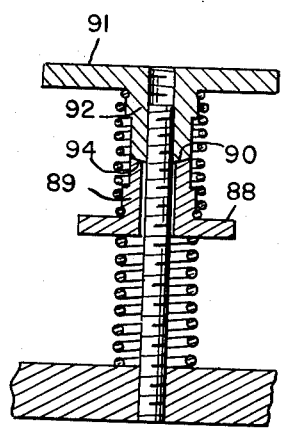
INVENTOR.
GEORGE W. MacARTHUR
BY
ATTORNEYS

United States Patent Office 2,727,544
Patented Dec. 20, 1955

2,727,544

NUT ACTUATED CLAMP BAR

George W. MacArthur, Farmington, Mich.

Application May 19, 1952, Serial No. 288,720

6 Claims. (Cl. 144—290)

The present invention relates to a work holder including a clamping bar.

It is an object of the present invention to provide a work holder including a clamping bar mounted for angular movement between a clamping position in which one end of the bar overlies a work piece, and a loading position in which the said one end of the bar is laterally displaced from the work piece to permit placement of the work piece in working position, in combination with clamping means operable on the bar to move the bar into clamping engagement with the work piece, and frictional means effective to rotate the clamping bar to clearance position upon actuation of the clamping means to release the work piece.

More specifically, it is an object of the present invention to provide a work support comprising a stud or bolt adapted to extend upwardly from a bed plate, a clamping bar having an enlarged opening intermediate its ends receiving the bolt, and providing for angular rotation of the bar, tilting of the bar, and vertical movement of the bar, a clamping nut on the bolt above the bar and adapted to press the bar downwardly against a work piece, friction means interposed between the nut and bar, stop means limiting angular movement of the bar, and an abutment disposed to underlie the other end of the bar when the bar is in position to engage a work piece.

It is a further object of the present invention to provide in structure of the character described, friction means connecting a clamping nut and a clamp bar, the friction means including confronting aligned collars on the nut and bar, and a coil spring having at least the end portion thereof in frictional engagement with said collars.

Other objects and features of the invention will become apparent as the description proceeds, especially when taken in conjunction with the accompanying drawings, wherein:

Figure 3 is a perspective view of a modified work holder.

Figure 4 is a vertical section through a somewhat different embodiment of the present invention.

Figure 5 is a vertical section through yet another embodiment of the present invention.

Figure 1:
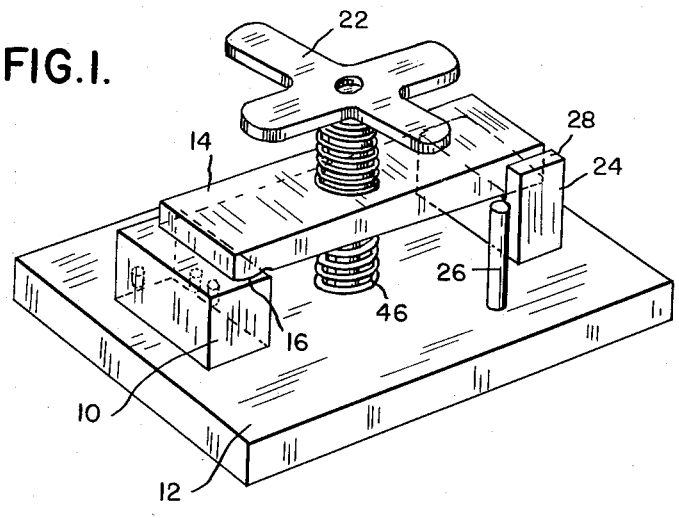
Figure 1 is a perspective view of a work holder constructed in accordance with the present invention.
Figure 2:
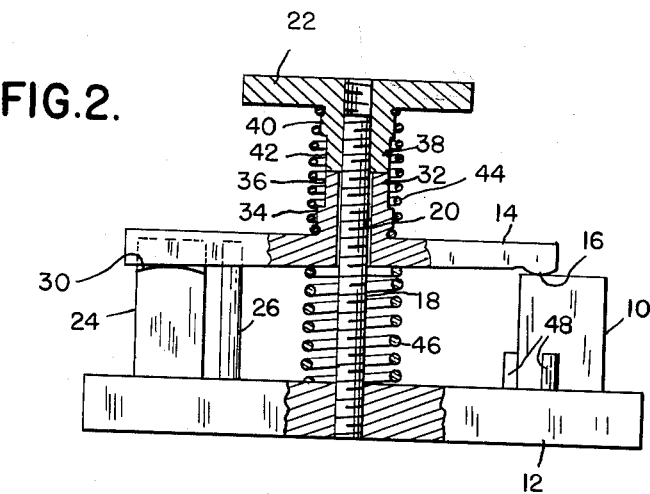
Figure 2 is a side elevation of the work holder shown in Figure 1, with parts in section.

Referring now to Figures 1 and 2 there is illustrated a work holder adapted to hold a work piece 10 in position on a bed plate 12. The work holder comprises a clamp bar 14 having one end rounded as indicated at 16 to engage the upper surface of the work piece 10. Extending upwardly from the bed plate 12 is a bolt or stud 18 and the clamp bar 14 has an enlarged opening 20 intermediate the ends thereof which loosely surrounds the bolt 18 and permits vertical movement, horizontal angular movement, and tilting movement of the bar about a horizontal axis. Threaded to the upper end of the bolt 18 is a clamping nut 22 adapted to urge the bar downwardly to effect clamping of the work piece 10.

Carried by the bed plate 12 are stops 24 and 26 adapted to limit horizontal angular movement of the clamp bar and to position the clamp bar in clamping position as seen in Figure 1, when one end of the bar engages a shoulder 28 on the stop 24. The stop 26 is adapted to engage the other end of the bar 14 after counterclockwise rotation of the bar from the position shown in Figure 1, and to thereby determine a loading position of the bar in which the bar is displaced laterally from the location of the work piece to permit easy placement of the work piece 10 in the working position.

In the embodiment of the invention illustrated in Figures 1 and 2 the stop 24 includes an abutment portion 30 having a rounded upper surface as best illustrated in Figure 2, which is adapted to underlie one end of the bar 14 when the bar 14 is in clamping position.

Friction means are provided effective to cause the bar to rotate to clamping position upon initial movement of the clamping nut 22 in a clamping direction, and to cause movement of the bar 14 to loading position upon initial movement of the clamping nut 22 to clamp releasing position.

This friction means comprises an upstanding collar 32 on the bar 14, the collar 32 having an enlarged portion 34 and a reduced portion 36. The nut 22 has a collar 38 in confronting aligned relationship to the collar 32. The collar 38 includes an enlarged portion 40 and a reduced portion 42, the reduced portions 36 and 42 of the collars being of the same diameter.

Interconnecting the collars 32 and 38 is a coil spring 44, the end portions of which are in frictional contact with the enlarged portions 34 and 40 of the collars 32 and 38 respectively. The central portion of the spring 44 is normally in clearance with respect to the reduced portions 36 and 42 of the collars. The coil spring 44 is proportioned to the enlarged portions 34 and 40 of the collars so as to establish a frictional connection therebetween which results in rotation of the clamp bar 14 upon rotation of the clamp nut 22 an amount permitted by the stop 26 and the stop portion 28. Additional rotation of the clamp nut 22 is permitted after angular movement of the clamp bar is arrested.

In addition, a lift spring 46 is provided which surrounds the bolt 18 and is interposed between the upper surface of the bed plate 12 and the lower surface of the clamp bar 14. The effectiveness of the lift spring 46 exceeds that of the coil spring 44 and is effective to lift the clamp bar 14 and to keep it in effective engagement with the nut 22.

With the parts in the position illustrated in Figure 2, clamping pressure is applied to the work piece 10 by the nut 22, this pressure having rocked the bar 14 in a clockwise direction about the fulcrum at the left hand end of the bar provided by the curved abutment surface 30. If now, the clamp nut 22 is loosened, the frictional connection between the nut and the bar will cause rotation of the clamp bar 14 to clearance position as soon as its frictional contact with the surface 30 and the work piece 10 is released. This angular movement is arrested in the illustrated embodiment after substantially 90 degrees of rotation of the bar 14, thus moving the clamping end of the bar laterally away from the work piece. This permits ready removal and replacement of the work piece. In the illustrated embodiment of the invention the work piece is accurately located prior to clamping by engagement with locating pins 48.

Referring now to the embodiment of the invention illustrated in Figure 3, there is illustrated a bed plate 50 having an upstanding threaded stud or bolt 52 surrounded by a lift spring 54 engaging the underside of the clamp bar 56, which in turn has an enlarged opening intermediate its ends through which the bolt 52 extends. Threaded to the upper end of the bolt 52 is a clamp nut 58 and the clamp bar 56 and nut 58 may be identical with the bar 14 and nut 22 illustrated in Figures 1 and 2. Friction means comprising a coil spring 60 interconnects confronting aligned collars on the clamp bar 56 and nut 58 as described in the preceding embodiment of the invention.

Located in position to underlie one end of the clamp bar 56 when the clamp bar is in clamping position is an abutment 62 herein illustrated as a bolt threaded into a suitable recess in the bed plate 50 and locked in adjusted position by a lock nut 64. A special work supporting fixture 66 is provided with a V-groove 68 adapted to receive and locate a work piece 70. The fixture 66 includes a stop plate 72 having a surface 74 adapted to be engaged by the clamping end of the bar 56 when the clamping end of the bar overlies the work piece 70. In addition, the plate 72 includes a stop surface 76 adapted to be engaged by the other end of the clamp bar 56 when the clamp bar is swung to loading position to provide for ready removal and replacement of the work piece 70.

Inasmuch as clamping of the work piece by the clamp bar requires a tilting movement of the clamp bar about a horizontal axis, it is desirable to provide an adequate bearing surface between the clamping nut and the clamp bar. In Figure 4 this arrangement is illustrated as comprising an annular washer set comprising a lower annular washer 80 having an upwardly concave spherical surface in conjunction with an upper annular washer 82 having a downwardly convex spherical surface interposed between the clamp bar 84 and the clamp nut 85. In this case the washers are of smaller diameter than collars 86 and 87 of the nut and bar respectively, thus being equivalent to the reduced portions 36 and 42 of the embodiment of the invention shown in Figures 1 and 2.

In Figure 5 there is illustrated a simplified arrangement in which the clamp bar 88 has an upwardly extending collar 89, the upper end of which is spherically concave as indicated at 90. The clamp nut 91 has a downwardly extending collar 92, the lower end of which is spherically convex as illustrated at 94.

The present arrangement facilitates the placement, clamping, unclamping, removal, and replacement of a work piece by a machine operator. It is only necessary for the operator to rotate the clamping nut in the proper direction to release clamping pressure between the clamp bar and the work piece and this results in rotation of the clamp bar to a position in which its clamping end is displaced laterally from the work piece, thus permitting the work piece to be lifted directly and replaced. The operator in order to clamp the new work piece in position is required only to rotate the clamp nut in the proper direction. Initial rotation of the clamp nut in clamping direction will swing the clamp bar back to clamping position with one end thereof overlying the work piece, at which time further angular movement of the clamp bar is arrested by engagement with a stop. However, further rotation of the clamp nut is permitted by the frictional connection between the nut and bar and the bar is thus urged downwardly into clamping engagement with the work piece.

The helix of the friction spring is of a hand opposite to the thread of the bolt. Thus, where the thread of the bolt is right hand, as is conventional, the friction spring has a left hand helix. This produces increased friction due to the tendency of the spring to "wrap" as the clamping nut is turned in clamping direction, thus insuring accurate positioning of the clamp bar against its stop in clamping position. However, the reduced central section of the nut and clamp bar collars prevents a tight lock from resulting.

Thus, the operator requires the use of only one hand to clamp and release the work piece, and the other hand may be used to remove and replace the work piece.

The drawings and the foregoing specification constitute a description of the improved clamp bar in such full, clear, concise and exact terms as to enable any person skilled in the art to practice the invention, the scope of which is indicated by the appended claims.

What I claim as my invention is:

1. A work holder comprising a bed plate, a threaded bolt extending upwardly from said bed plate, a clamp bar having an opening larger than said bolt intermediate its ends through which said bolt extends to provide for vertical, angular, and tilting movement of said bar, a clamping nut on said bolt above said bar, a lift spring surrounding said bolt and interposed between said bed plate and bar, friction means connecting said nut and bar, said friction means comprising confronting aligned collars on said nut and bar, and a coil spring surrounding said collars in frictional contact therewith, stop means limiting rotation of said bar between a clamping position in which one end of said bar overlies a work piece and a loading position in which the said one end of said bar is displaced laterally from the clamping position to permit ready placement of the work piece in position to be clamped, and an abutment on said bed plate in position to underlie the other end of said bar when said bar is in clamping position.

2. A work holder as defined in claim 1 in which a pair of washers are interposed between the ends of said collars, one of said washers having a concave spherical seat and the other having a convex spherical seating portion received in said seat, and said washers being of less diameter than said collars.

3. A work holder as defined in claim 1 in which the adjacent end portions of said collars are reduced, and only the end portions of said coil spring are in frictional contact with the portions of said collars beyond the reduced end portions thereof.

4. A work holder as defined in claim 3 in which the coil spring is of opposite hand to the threads on said nut and bolt to produce greater friction due to "wind-up" of said coil spring during clamping than during unclamping.

5. A work holder as defined in claim 1 in which the end of one of said collars is spherically concave and in which the end of the other of said collars is spherically convex and shaped to have a seating engagement with the spherically concave end of said one collar.

6. A work holder comprising a bed plate, a threaded bolt extending upwardly from said bed plate, a clamp bar having an opening larger than said bolt intermediate its ends through which said bolt extends to provide for vertical, angular, and tilting movement of said bar, a clamping nut threaded on said bolt above said bar for moving the latter toward said bed plate, a lift spring surrounding said bolt and interposed between said bed plate and bar, stop means limiting rotation of said bar between a clamping position in which one end of said bar overlies a workpiece and a loading position in which the said one end of said bar is displaced laterally from the clamping position to permit ready placement of the workpiece in position to be clamped, friction means opposing relative rotation between said nut and bar whereby rotation of said nut to move the same vertically along said bolt operates to rotate said bar within the limits provided by said stop means, said friction means enabling continued rotation of said nut after rotation of said bar has been arrested by said stop means, and an abutment on said bed plate in position to underlie the other end of said bar when said bar is in clamping position.

References Cited in the file of this patent

UNITED STATES PATENTS

| Number | Name | Date |
|---|---|---|
| 756,058 | Royle | Mar. 29, 1904 |
| 893,754 | Russell | July 21, 1908 |
| 1,049,337 | Burns | Jan. 7, 1913 |
| 1,758,733 | Cayo | May 13, 1930 |
| 2,061,718 | Stahl | Nov. 24, 1936 |
| 2,389,184 | Cooke | Nov. 20, 1945 |
| 2,421,957 | Mead | June 10, 1947 |
| 2,512,787 | Bowlzer | June 27, 1950 |